United States Patent [19]

Owens

[11] Patent Number: 4,868,412

[45] Date of Patent: Sep. 19, 1989

[54] DISTRIBUTED CONTROL SYSTEM

[75] Inventor: William R. Owens, Rockford, Ill.

[73] Assignee: Sundstrand Corporation, Rockford, Ill.

[21] Appl. No.: 264,232

[22] Filed: Oct. 28, 1988

[51] Int. Cl.[4] .............................................. H02J 9/00
[52] U.S. Cl. ..................................... 307/141; 307/86; 307/34; 323/906; 320/40; 361/87
[58] Field of Search ................................... 307/34–41, 307/64, 66, 85, 86, 87, 112, 132 R, 141, 141.1, 141.8; 361/88–94; 320/7, 16, 17, 28, 29, 31, 32, 39, 40, 48, 51, 906

[56] References Cited

U.S. PATENT DOCUMENTS

| | | | |
|---|---|---|---|
| 3,629,548 | 12/1971 | Rygiol | 307/34 X |
| 3,886,932 | 6/1975 | Suessmilch | 361/87 X |
| 3,896,368 | 7/1975 | Rym | 323/906 X |
| 3,912,940 | 10/1975 | Vince | 307/86 X |
| 3,956,638 | 5/1976 | Ahrens et al. | 307/53 X |
| 4,017,779 | 4/1977 | McDonald et al. | 307/86 X |
| 4,290,007 | 9/1981 | Fisher et al. | 323/906 X |
| 4,313,078 | 1/1982 | Bilsky et al. | 323/906 X |
| 4,334,256 | 6/1982 | Mings . | |
| 4,428,021 | 1/1984 | Chen et al. . | |
| 4,461,690 | 7/1984 | Rolff et al. | 307/32 X |
| 4,476,399 | 10/1984 | Yoshida et al. | 307/64 X |
| 4,514,619 | 4/1985 | Kugelman . | |
| 4,577,144 | 3/1986 | Hodgman et al. | 320/48 X |
| 4,580,090 | 4/1986 | Bailey et al. | 323/906 X |
| 4,641,078 | 2/1987 | Short | 320/40 X |
| 4,740,859 | 4/1988 | Little . | |

Primary Examiner—William M. Shoop, Jr.
Assistant Examiner—Paul Ip
Attorney, Agent, or Firm—William D. Lanyi

[57] ABSTRACT

A control system is provided in which a plurality of independent control elements are each capable of generating a random value and determining a time delay as a function of that random value. Each of the control elements accesses the magnitude of a sensed parameter and responds to that magnitude. When correction of the sensed parameter is required, each independent control element senses the need for a correction and delays by an amount of time determined randomly and independent from all other control elements. After the randomly determined time delay has elapsed for each control element, that control element again accesses the magnitude of the sensed parameter and, if correction is still required, changes the connection status of an associated switch. In a preferred embodiment of the present invention, the control element interrogates the status of its associated switch to determine if actuation would benefit the correction of the magnitude of the sensed parameter.

22 Claims, 6 Drawing Sheets

DISTRIBUTED CONTROL SYSTEM

BACKGROUND OF THE INVENTION

1. Field of the Invention:

The present invention is related generally to a distributed control system for an electric power system and, more specifically, to a distributed control system which utilizes a plurality of independent control elements with each of the control elements having the capacity to independently respond to the magnitude of a sensed parameter at a time determined by a random value.

2. Description of the Related Art:

It is known to provide an electric circuit with a plurality of corrective components, such as resistors, capacitors or inductors, which are connectable in electrical communication with the electric circuit for the purpose of responding to the magnitude of a sensed parameter, such as a voltage potential at a predetermined point in the electrical circuit, an electrical current or power factor. The plurality of corrective components is provided for two purposes. First, the use of a plurality of corrective components provides needed redundancy in situations where long term use of the control system may result in the failure of one or more of the corrective components or their associated control elements at a time when repair is inconvenient or impossible. In addition, the plurality of corrective components provides a degree of resolution in the corrective response to a sensed condition relating to the electrical circuit. For example, a minor correction can be achieved by activating very few corrective components, whereas a major correction may require many or all of the available corrective components to be activated.

U.S. Pat. No. 4,334,256, which issued to Mings on June 8, 1982, describes an automotive surge suppressor which provides a high power semiconductor switching arrangement that is controlled by a sensing circuit to suppress transient surges while maintaining operating voltage. The magnitude of a surge determines the rate of current flow through the semiconductor arrangement to maintain the operating voltage required while dissipating the excess power across a load resistance. The surge suppressor is intended to protect an electrical system and is particularly applicable to automotive electrical systems.

U.S. Pat. No. 4,514,619, which issued to Kugelman on Apr. 30, 1985, describes a circuit which provides indirect current monitoring via voltage and impedance monitoring. It includes electrical circuitry for monitoring the current flow through resistance elements on the leading edge of an aircraft wing or a horizontal stabilizer. The resistance elements are individually and sequentially activated for heating to thereby effect a de-icing or anti-icing function. The non-activated elements are sensed by the circuitry to determine inferentially if there is a predetermined current flow through the heating elements to achieve the intended de-icing or anti-icing function.

U.S. Pat. No. 4,740,859, which issued to Little on Apr. 26, 1988, describes a transient surge suppressor and line short monitor. The device is utilized in an alternating current transmission system and includes a metallic case or casing into which lead lines connected to each of the power lines and to the neutral lines are introduced. The metalic case encompasses a series connected varistor and fuse pair connected between each lead from an incoming alternating current power line and the lead from the neutral line. A series connected neon lamp and limiting resistor pair inside of the case are connected across each varistor to be normally energized to give visual indication of the effectiveness and readiness of the suppressor to pass voltage surges above a predetermined maximum voltage to neutral and to give visual indication that there is no short circuit between the power lines and the neutral line.

U.S. Pat. No. 4,428,021, which issued to Chen et al on Jan. 24, 1984, discloses a current monitoring apparatus for monitoring the fault current in the ground conductor of a polyphase alternating current electrical power system. When the fault current exceeds a predetermined level, the magnetic field produced causes a magnetic reed switch to close and open at twice the alternating current frequency. Pulse producing circuitry connected to the reed switch responds to the switch action to produce pulses at the same frequency. The pulses are counted by logic circuitry and when a predetermined number of pulses have been counted an output signal triggers circuitry which trips circuit breaker apparatus in the power system. The delay period between first detecting the fault current and tripping the circuit breaker apparatus can be adjusted by changing the number of pulses to be counted by the logic circuitry before it produces an output signal.

When a control system incorporates a plurality of control elements, with each control element having the capability of contributing to an effort to correct a characteristic of an electrical circuit, some scheme must be employed to coordinate the action of each of the control elements. If a central controller is utilized, this coordination is relatively easy to implement. The central controller merely determines a sequence of activation for each of the corrective components along with a predetermined time delay between subsequent activations. However, many applications do not lend themselves to the use of a single central controller. For example, in space flight applications, redundancy must be provided to assure that a failed controller does not jeopardize the mission. If a single central controller is utilized and that central controller fails for any reason, the successful operation of the control system is deleteriously affected. To avoid this problem, a plurality of independent control elements can be used, with each independent control element controlling an individual corrective component such as a resistor, a capacitor, an inductor or any other electrical component that can be utilized to correct a sensed parameter relating to the electrical circuit.

The use of independent control elements introduces another problem. If each of the independent control elements responds to a sensed parameter without coordination with the other independent control elements, some means must be provided to prevent all of the independent control elements from actuating their respective corrective components simultaneously. If this occurs, a severe overcorrection could result, making the control system unstable. In other words, when a monitored parameter exceeds an acceptable threshold magnitude, all of the independent control elements could react simultaneously to reduce that sensed parameter, such as voltage, with the possibility that the overcorrection could result in a severe reduction in the sensed parameter. That severe reduction could reduce the sensed parameter to a magnitude below an acceptable threshold and subsequently induce the independent control elements to once again react in the opposite direction, again over compensating. It should be apparent that some means of coordination to prevent this instability must be provided.

One method that can be employed to avoid the unstable situation described above is to provide each independent control element with a predetermined time delay. In this type of system, each independent control element would delay its response by its assigned predetermined time delay and only activate its respective corrective component after the time delay period has elapsed and the sensed parameter is again measured. If each of the independent control elements is assigned a different time delay, they would respond sequentially to a sensed parameter that requires correction and the magnitude of the sensed parameter would be corrected over a period of time as each of the independent control elements progressively activates its associated corrective component. Therefore, when the magnitude of a sensed parameter is determined to be out of an acceptable range, each of the independent control elements would sense this condition. Then, the independent control element with the shortest time delay would activate its respective corrective component first. Subsequently, the independent control element with the second lowest time delay would activate its corrective component if the magnitude of the sensed parameter remained out of the acceptable range. Subsequently, the independent control element with the third lowest time delay would activate its corrective component following a remeasurement of the sensed parameter. This process would continue until the magnitude of the sensed parameter once again achieved an acceptable level. This technique solves the problem described above relating to the simultaneous activation of all of the independent control elements. However, this technique also introduces another disadvantageous characteristic. For example, if the independent control element with the lowest time delay value fails for any reason, the speed of response of the control system is slowed by that time delay value. If the control system is employed in a spacecraft, or any other apparatus in which replacement of defective parts is difficult, the response of the control system is forever slowed. It should be apparent that, in a system as described above, if two or more of the independent control elements with the shortest time delays have failed, a significant degradation of the control system will be experienced. In addition, this degradation of response will remain in effect during the entire mission of the apparatus in which this type of control system is utilized.

A significant benefit can be achieved if a control system is provided in which independent control elements are utilized, but wherein a technique is employed to avoid the response degradation which is encumbent when the independent control units with the shortest fixed time delays fail. Furthermore, if a plurality of independent control elements is provided in the control system and the control elements are employed in reaction to a sensed parameter in some order which is not constantly repeated, the magnitude of the sensed parameter can be corrected in an orderly fashion and the failure of one or more of the control elements will not have the continuous response degradation effect described above.

SUMMARY OF THE INVENTION

The present invention relates to a control system which employs a plurality of independent control elements in which each of the control elements responds to a magnitude of a sensed parameter in a manner which is independent from all of the other control elements and which is furthermore determined in a random fashion. More specifically, the present invention provides each of its independent control elements with the ability to generate a random value and, as a function of that random value, to determine a time delay. When any of the independent control elements determines that a magnitude of a sensed parameter requires corrective action, it delays its reaction by the randomly determined time delay and, after the passage of elapsed time equivalent to the time delay, again accesses a measurement of the sensed parameter magnitude prior to activating its corrective component. If, after the time delay has elapsed, the magnitude of the sensed parameter is within it acceptable limits, no action is taken by the independent control element. If, however, additional corrective action is required, the independent control element activates its associated corrective component at the end of the predetermined time delay. Since each of the plurality of control elements of the present invention generates its own random value and determines its own time delay as a function of that random value, the order in which the control elements are activated is, itself, randomized. This randomization has two beneficial effects. First, it provides a control system in which the independent control elements do not all activate simultaneously with the resulting instability described above. In addition, no specific control element is always the fastest responding element in the control system. Therefore, if an independent control element fails for any reason, the probability that that element will be the first that would have responded to the circuit condition is minimized and determined randomly. This randomization avoids the condition in which the fastest responding control element fails and the control system is burdened with a perpetual degradation of its response characteristic to changes in the sensed parameter which require correction.

A control system made in accordance with the present invention comprises a means for generating a random value (reference numeral 59 in FIG. 4). This random value generating means can be incorporated in a microprocessor (reference numeral 58 in FIG. 4) utilizing one of many known types of random number generators. It is recognized that most known random number generators actually generate pseudorandom numbers which are not truly random. However, for the purposes of this discussion, these pseudorandom numbers will be described as being random. The operation of the present invention is not dependent on those random numbers being truly random and, in fact, the use of pseudorandom values is acceptable in a preferred embodiment of the present invention. The present invention also comprises a means for measuring elapsed time (reference numeral 53 in FIG. 4). Most microprocessors have this capability. The use of an internal clock which is provided by the microprocessor is acceptable as long as the resolution of the clock provides incremental time measurements that are acceptable for the specific application in which the system is used. In addition, a preferred embodiment of the present invention comprises a means for accessing (reference numeral 55 in FIG. 4) a magnitude of a sensed parameter. This can be accomplished in at least two ways. First, each independent control element of the present invention can be provided with some means for measuring (reference numeral 56 in FIG. 4) the sensed parameter. This measuring means could be incorporated as part of the control element. Alternatively, each of the independent control elements could be connected in signal communication with some parameter measuring apparatus which could, in turn, provide this information to each of the independent control elements. Naturally, if this latter technique is employed, redundancy should be provided in case the central measuring device fails. Whether the independent control element measures the parameter itself or, alternatively, receives information relating to the magnitude of the sensed parameter from another component, the present invenion includes some means for accessing (reference numeral 55 in FIG. 4) that magnitude of the sensed parameter.

The present invention also comprises a means for determining a time delay (reference numeral 61 in FIG. 4) as a function of the random value described above. The generating means and the determining means are associated in signal communication with each other. For example, software can be employed within a microprocessor to mathematically convert a random number into a number of counts of the internal clock (reference numeral 53 in FIG. 4) of the microprocessor. More specifically, in the simplest possible implementation of the present invention, the random number can be directly converted into a number of 60 hertz pulses of the internal clock. However, it should be apparent that many conversion schemes can be employed within the scope of the present invention.

In addition, the present invention comprises a means for changing (reference numeral S1 in FIG. 4) a connection status between a corrective component (reference character R1 in FIG. 4) and an electrical circuit in response to the accessed magnitude of the sensed parameter following a period of elapsed time after the magnitude is sensed. This changing means of the present invention could be an output port of a microprocessor (reference numeral 58 in FIG. 4) that is connected in signal communication (reference numeral 63 in FIG. 4) with a switch. That switch would be disposed in association with a corrective component (reference characters R1-R10 in FIG. 1 and R1 in FIG. 4), such as a resistor, to selectively connect or disconnect the corrective components in electrical communication with an electrical circuit. In a preferred embodiment of the present invention, the connection status changing means would be activated following a period of elapsed time equivalent to the randomly determined time delay. After the time delay has elapsed, a new value for the magnitude of the sensed parameter would be accessed for the purpose of determining whether or not correction of the sensed parameter is still required after the elapsed time has passed. The connection status changing means (reference character S1 in FIG. 4) is connected in signal communication with the measuring means and the magnitude accessing means. These elements of the present invention are described as being connected in signal communication with each other. However, it should be understood that the relation between these elements of the present invention may be that they are individual segments of a software program. In that case, although these elements are appropriately described as being in signal communication with each other, it should be understood that they can also be segments of a software routine which are associated together in information exchange relation.

The characteristics discussed above describe a single independent control element (reference characters CE1 in FIG. 4) of the present invention. It should be understood that a plurality of these independent control elements (reference characters CE1-CE10 in FIG. 1) are associated together in a preferred embodiment of the present invention and each of the independent control elements are essentially identical to each other. When associated with an electrical circuit that is being controlled, each of the independent control elements is connected in signal communication with a specific corrective component, such as a resistor, and with a switch associated with that corrective component. The corrective component can be a resistor, a capacitor, an inductor or any other component which can be used to correct the magnitude of a sensed parameter relating to the electrical circuit.

In summary, a preferred embodiment of the present invention includes a plurality of control elements with each of the plurality of control elements comprising a means for generating a random value, means connected in signal communication with the generating means for determining a time delay as a function of the random value, means for accessing a magnitude of a sensed parameter, means for measuring elapsed time and means, connected in signal communication with the accessing means, the measuring means and the determining means, for changing a connection status between a corrective component and an electrical circuit in response to a preselected value of the sensed parameter magnitude following a predetermined period of elapsed time after the magnitude is sensed, wherein the period of elapsed time is determined as a function of the time delay.

BRIEF DESCRIPTION OF THE DRAWING

The present invention will be more fully understood by reading the description of the preferred embodiment in conjunction with the drawing, in which.

DESCRIPTION OF THE PREFERRED EMBODIMENT

The preferred embodiment of the present invention will be described in terms of a specific exemplary application in which the voltage of an electrical circuit is the sensed parameter being controlled. However, it should be understood that the basic concept of the present invention can be utilized to monitor many different types of parameters relating to an electrical circuit. For example, electrical current can be monitored and controlled by the present invention. Similarly, power factor can be controlled by the present invention in certain circuit applications. Of course, the disposition of corrective components within the electrical circuit and the types of corrective components used would differ in each of these applications.

A particular application in which the present invention is especially well suited is within a space vehicle which orbits the earth. In this type of application, the space vehicle continually passes from insolation to eclipse and back again to insolation. If the space vehicle is provided with energy storage components, such as batteries, and energy receiving components, such as solar cells, some means must be provided for controlling the power system of the vehicle under conditions which vary from receiving more energy than is required, such as during insolation, to being deprived of any incoming energy, such as during eclipse.

Figure 4:
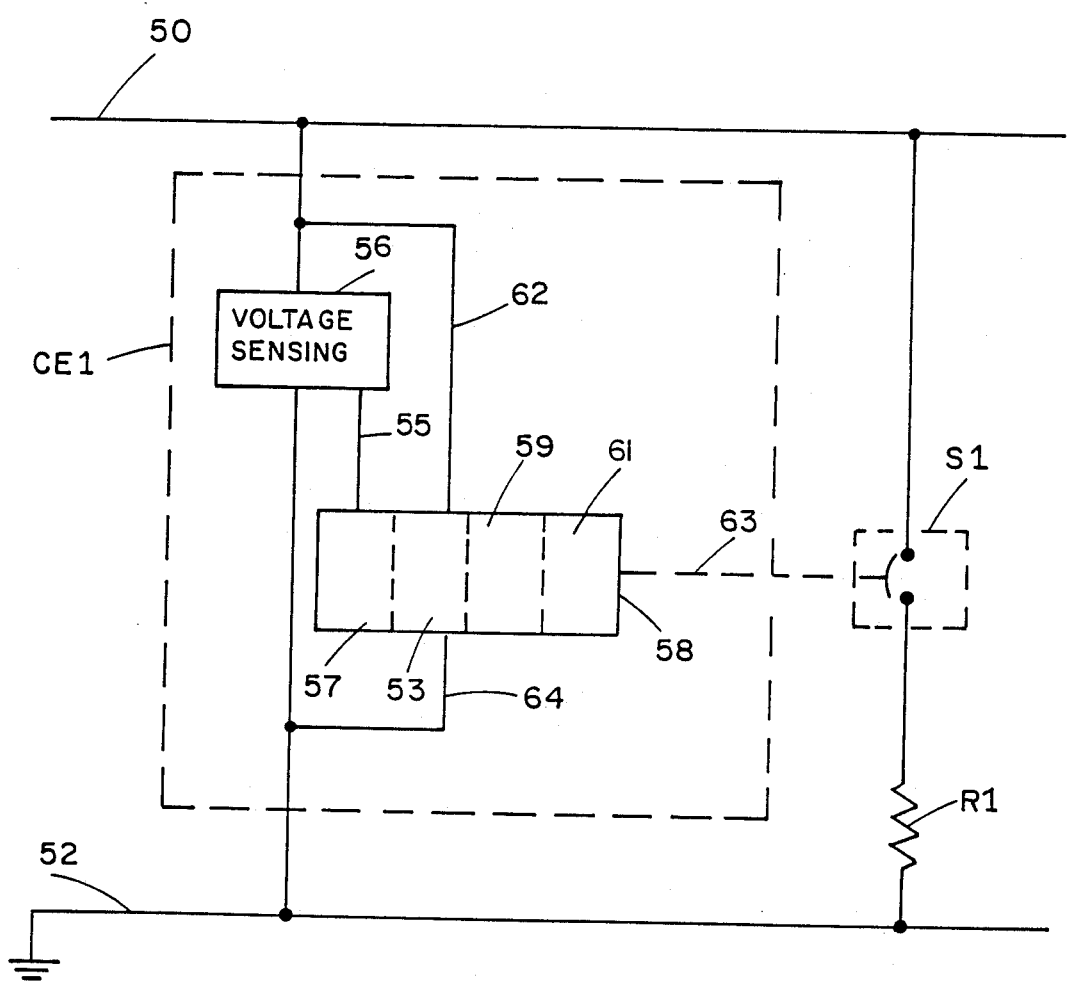
FIG. 4 illustrates one control element incorporated in a preferred embodiment of the present invention.

Before describing the present invention in detail, it should be understood that the energy storage components, such as batteries, receive more energy during insolation than that which is required by the space vehicle. As the batteries receive more and more energy from the solar cells, the voltage provided by the batteries to the electrical circuit continues to increase and will eventually achieve a magnitude that is above an acceptable range. When excessive voltage is available, some means must be provided for reducing that voltage to within acceptable limits. In addition, as the space vehicle passes into eclipse, the batteries will gradually be drained and a resulting voltage reduction will be experienced. The independent control elements of the present invention must be able to respond to both of these conditions to regulate the voltage provided to the electrical circuit of the space vehicle. For voltage regulation within a space vehicle, it is desirable to provide a control system that is implemented by a number of relatively simple and identical control elements. No communication between the control elements should be necessary and the independent control elements should not require any direct indication of the states of the other independent control elements as a necessity for proper voltage regulation. In a preferred embodiment of the present invention, the control system incorporates a number of shunt regulators. Resistive elements (reference characters R1-R10 in FIG. 1 and R1 in FIG. 4), together with power switches (reference characters S1-S10 in FIG. 1 and S1 in FIG. 4) and control logic (reference numeral 57 in FIG. 4), load or unload the electrical power system as needed to keep the voltage within appropriate power quality limits. An independent control element in one specific embodiment of the present invention, as illustrated in FIG. 4 along with associated components, comprises a resistor R1, a power switch S1, control logic 57 and voltage sensing circuitry. Operation of the control element is relatively simple. When the voltage sensing circuitry 56 detects either an overvoltage or an undervoltage condition, the control logic commands the power switch to close if there is an overvoltage or, alternatively, to open if there is an undervoltage condition. In most known schemes of this type, one overwhelming problem exists. If this technique is simply implemented, it will result in all of the control elements opening or closing virtually simultaneously. Therefore, the power bus would either see all of the control element resistive loads activated on or off simultaneously. This type of simplistic two-state control is unlikely to regulate the bus voltage within reasonable limits and is likely to exhibit severe instability. A relatively simple modification will avoid this instability. If each of the control elements is provided with a different delay interval, they can be arranged to open or close sequentially. Under this type of arrangement, each control element continually senses the bus voltage during the delay interval and, if the voltage returns to within acceptable limits before the power switch is commanded to open or close at the end of the delay interval, that command is cancelled. Otherwise, the power switch would operate to effect the connection status between the corrective component and the electrical circuit. Under a system of that type, only the required number of control elements will operate to return the voltage to within the power quality limits. However, it should be understood that a system incorporating this simple scheme does not exhibit complete fault tolerance. The present invention, which is described below, avoids these problems and provides a control system which exhibits a high degree of fault tolerance.

Figure 1:
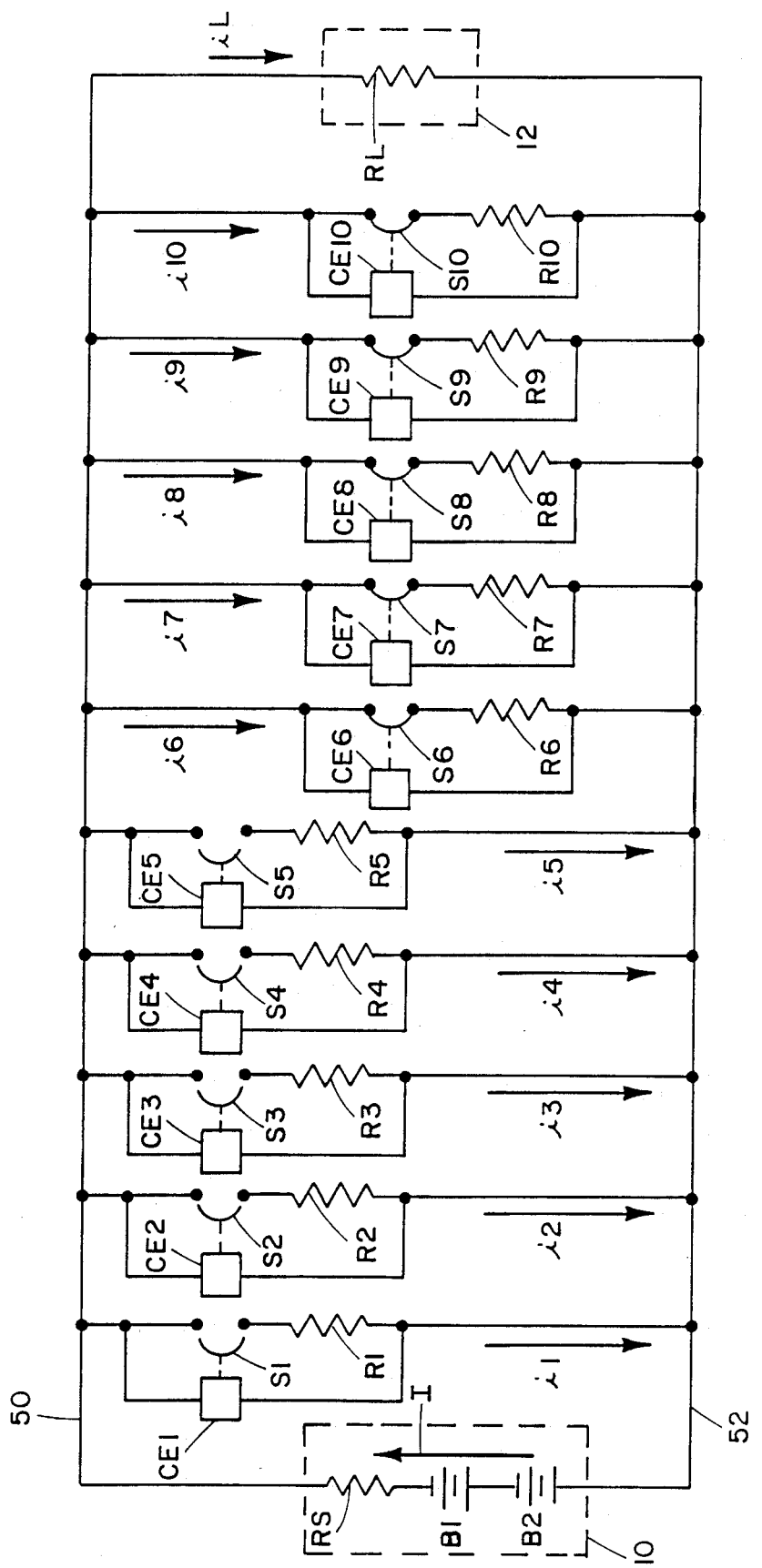
FIG. 1 illustrates a control system incorporating the present invention.

FIG. 1 illustrates an electrical schematic which represents a control system for controlling the power system within a device, such as a space vehicle. A power source 10 is provided for the purpose of supplying electrical power to a load 12. In FIG. 1, the power source 10 is illustrated by a dashed box. Within the dashed box of the power source 10, two batteries, B1 and B2, are illustrated for purposes of schematically showing the source of DC power. It should be understood that the use of two batteries is merely exemplary and, in many embodiments of the present invention, the related electrical circuit could employ alternative numbers of batteries or, in fact, alternative sources of AC or DC electrical power. Also shown within the dashed box of the power supply 10 is a resistor RS which is used to schematically illustrate the internal resistance of the power source itself. It should be understood that the resistance RS is used to illustrate the inherant resistance of the batteries, B1 and B2, and other related resistances of the power source 10.

The load 12 is schematically illustrated as a single resistor RL in FIG. 1. It should also be understood that the load 12 could comprise a plurality of components and, furthermore, that the resistor RL in FIG. 1 is used only to schematically illustrate the existence of a load.

For purposes of describing the present invention, the electrical circuit in FIG. 1 comprises a plurality of exemplary control elements, CE1-CE5, which are associated with switches, S1-S5, that are shown in an opened state. In addition, another plurality of exemplary control elements, CE6-CE10, are shown associated with switches, S6-S10, which are illustrated in a closed state. It is anticipated that a control system incorporating the present invention would include a plurality of switches in a closed state along with another plurality of switches in an opened state for purposes of providing flexibility of control. In other words, the electrical circuit is designed to provide the ability to regulate the circuit voltage in either direction. However, it should also be understood that, during operation, any of the ten switches illustrated in FIG. 1 could be in an opened or a closed state, depending on the prior history of operation of the control system. Also shown in FIG. 1 is a plurality of corrective components, such as resistors, R1-R10, which are each associated with one of the control elements. The electrical currents flowing through the resistors, R1–R10, are indicated as i1–i10, respectively. Furthermore, the current flowing through the load 12 is indicated by iL.

During operation, the total current I flowing through the power source 10 is equal to the sum of all of the currents flowing through the resistors. R1–R10, and the current flowing through the load 12, as indicated by iL. It should be apparent that, with the switches in the states shown in FIG. 1, currents i1–i5 would be equal to zero and the current I flowing through the power source 10 would be equivalent to the sum of currents, i6–i10, flowing through resistors, R6–R10, plus the current iL flowing through the load 12. If, when the electrical circuit is in the state shown in FIG. 1, an overvoltage situation is sensed, the closure of any one of the switches associated with control elements CE1–CE5 would have the effect of increasing current I and, because of the resulting increased voltage drop across resistor RS, the voltage across the power source 10 would be reduced. Similarly, if any of the closed switches, S6–S10, were opened, the current flowing through the associated resistor would be reduced to zero along with a corresponding reduction in current I. This would decrease the voltage drop across resistor RS and raise the voltage potential across the power source 10.

Figure 2:
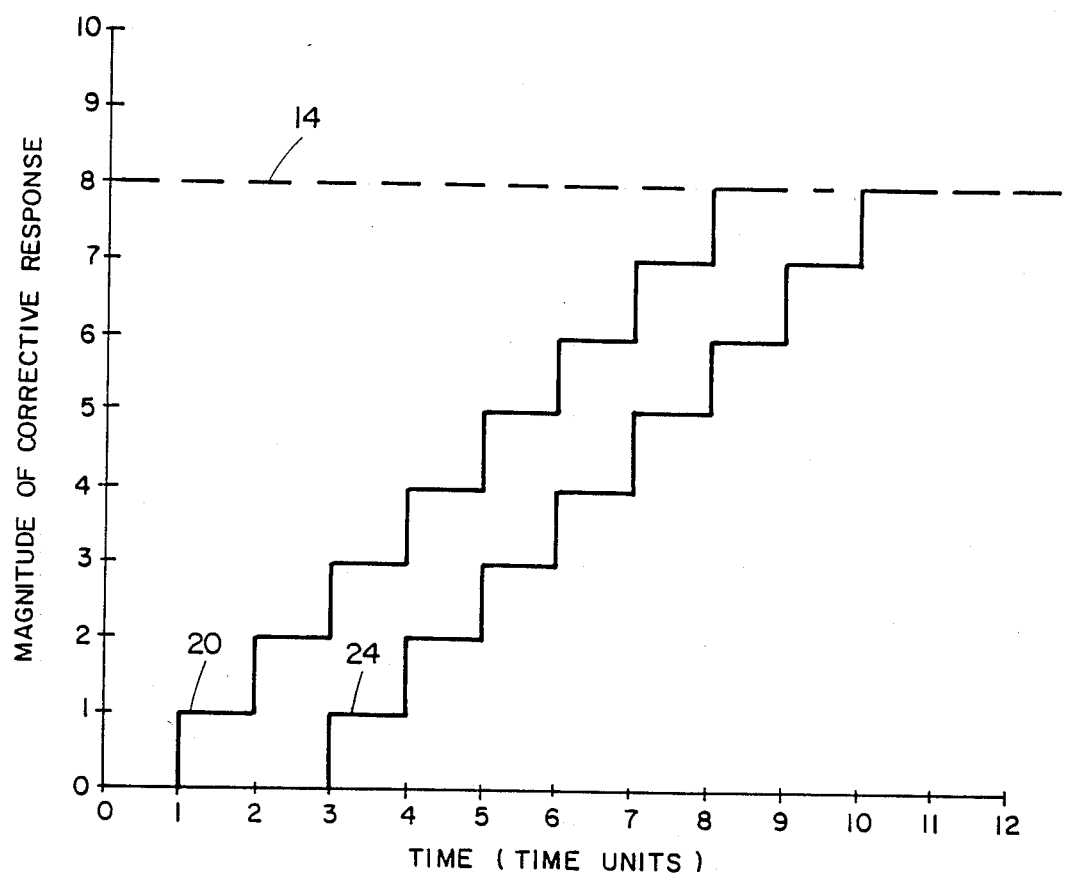
FIG. 2 illustrates a hypothetical result in which known control schemes are implemented and failure occurs in the fastest responding control elements.

Using FIG. 1 as an illustration, alternative schemes will be described for the purpose of illustrating the disadvantages of those alternative schemes and the advantage of the present invention. For these purposes, it will first be hypothetically assumed that each of the control elements, CE1–CE10, is in an opened state and, furthermore, that the voltage is sensed as being too high. It will further be hypothetically assumed, for the purpose of this illustration, that eight resistors, or corrective components, will be required to correct the sensed parameter magnitude. As described above, one alternative control scheme would be to assign each of the control elements a predetermined time delay. For these purposes, it will be assumed that control element CE1 is assigned a time delay of one time unit, control element CE2 is assigned a time delay of two time units, control element CE3 is assigned a time delay of three time units and so on. With reference to FIG. 2, the magnitude of accumulated corrective response is shown as a function of time. Dashed line 14 indicates the level of total required response which, as stated above, will be assumed to be equivalent to the use of eight resistors, with each of the resistors, R1–R10, being equal in magnitude in this example. As indicated by line 20, the first control element activates its associated corrective component at the end of a time delay equivalent to one time unit. This raises the accumulated corrective response to a magnitude equivalent to the use of one resistor. At a time equal to two time units, the second corrective component is activated to raise the accumulated corrective response to a magnitude of two. This continues until, after eight time units, the accumulated magnitude of corrective response is equal to eight resistors and the magnitude of the sensed parameter is assumed to be corrected to acceptable limits. The technique described in conjunction with line 20 is satisfactory to distribute the activation of the switches if all of the control elements are operative along with their respective switches and resistors. However, for purposes of illustrating the advantage of the present invention, a severe disadvantage of the above described scheme will be illustrated. If, hypothetically, control elements CE1 and CE2 fail, they will be unable to assist in the correction of the sensed parameter. Since control element CE1 is intended to be activated at the end of one time unit, no corrective response will be implemented at the end of one time unit because of the failure of control element CE1. Similarly, if control element CE2 has also failed, no response will be experienced at the end of two time units. The first actual response to the magnitude of the sensed parameter will occur, by control element CE3, at three time units following the time when the magnitude of the sensed parameter is sensed. This is illustrated by line 24 in FIG. 2. Then, after four time units has elapsed, control element CE4 will be activated to raise the accumulated response to two resistors. Assuming that all of the remaining control elements are operative, the sequential response of the system shown in FIG. 1 will occur as illustrated by line 24 in FIG. 2. As can be seen, this results in a delay of two time units in the overall response time of the control system because of the fact that, as illustrated by line 24, the eight resistor accumulated magnitude is not reached until the tenth time unit has elapsed and control elements CE9 and CE10 have been activated. The above description illustrates the disadvantage of assigning each control element a fixed time delay for delaying its response to a need for a correction of a sensed parameter.

With reference to FIG. 1, the present invention will be described in detail. The present invention provides each of the control elements, CE1-CE10, with the ability of generating a random value and determining a time delay which is a function of that random value. In a preferred embodiment of the present invention, the generation of the random value is provided by a microprocessor (reference numeral 58 in FIG. 4) which also determines the magnitude of a time delay as a function of that random value. As described above, this random value is most likely a pseudorandom value but, as also discussed above, a pseudorandom value is generally acceptable for use in conjunction with the present invention and will be referred to herein as a random value. Therefore, at any point in time, each of the control elements shown in FIG. 1 will have previously generated a random value and previously determined a time delay as a function of that random value.

In FIG. 1, each of the control elements is shown being connected to points above and below the associated switch for the purpose of measuring the voltage potential across the switch. In each case where the associated switch is opened, this connection provides a measurement of the voltage across the power source 10. However, it should be understood that an alternative embodiment of the present invention would incorporate an external device which measures the voltage drop across the power source 10 and provides that information to each of the independent control elements. It should also be understood that the present invention does not depend on whether or not the control element itself measures the sensed parameter or, alternatively, accesses that information from an external voltage sensing source. The selection of this specific characteristic is dependent on the particular system with which the present invention is used and the requirements of that system.

Figure 3:
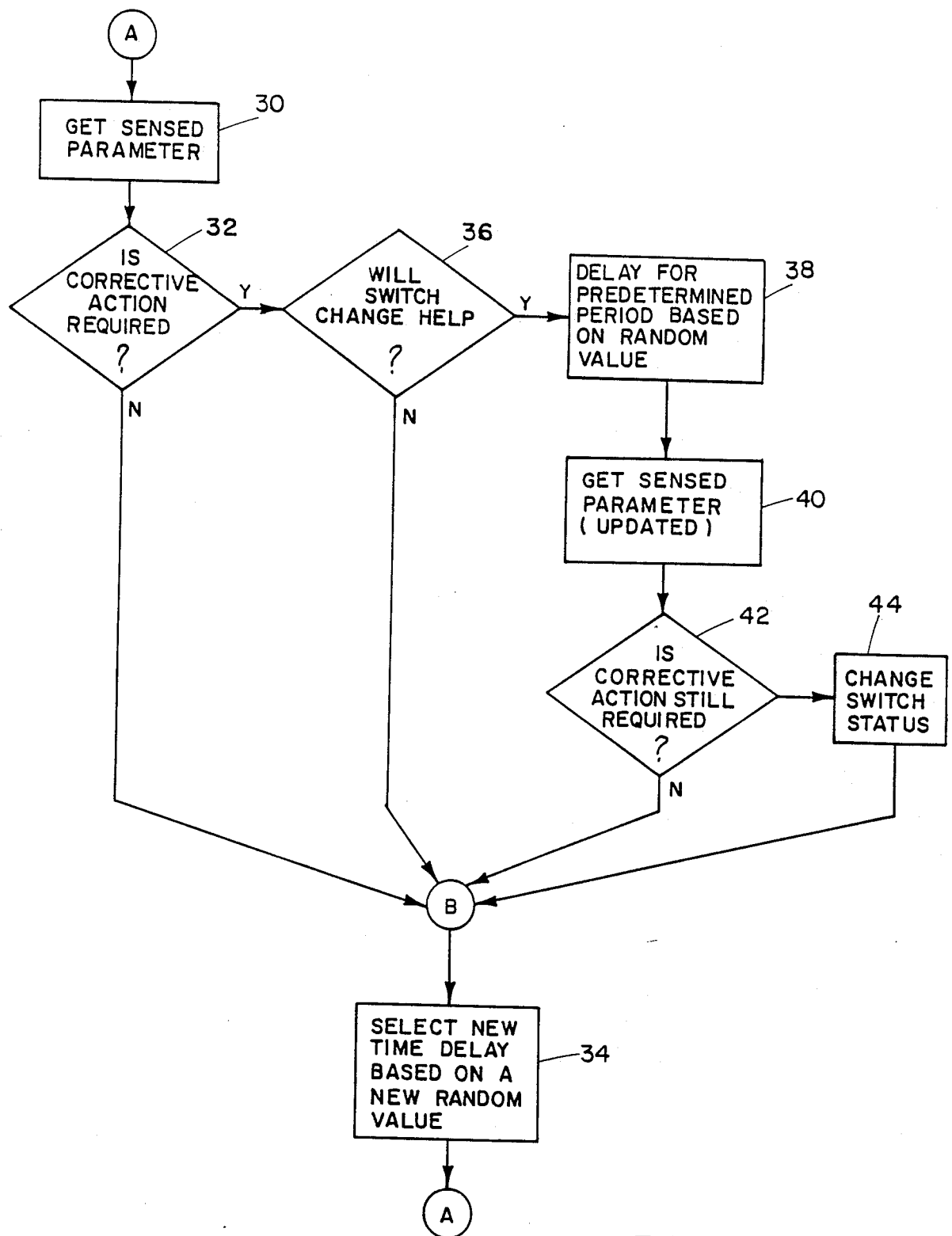
FIG. 3 illustrates a flow chart of the logic performed by the microprocessor in a preferred embodiment of the present invention.

FIG. 3 illustrates a logical flow chart of the control algorithm that would be performed by each of the independent control elements, CE1–CE10, shown in FIG. 1. It should be understood that in a preferred embodiment of the present invention, all of the control elements are identical to each other and would each contain a software program that performs the steps indicated by the flow chart in FIG. 3. Starting at point A in the flow chart, the control element receives the sensed parameter. In this illustration, the sensed parameter is the circuit voltage but, in alternative embodiments, the sensed parameter could be any one of a number of circuit characteristics such as electrical current or power factor. The sensed parameter could be obtained by a measurement performed by the control element itself or, alternatively, be access of that sensed parameter magnitude by the control element from an external measuring apparatus. This operation is illustrated by block 30 in FIG. 3. After the sensed parameter is accessed, it is compared to a preselected threshold value to determine whether or not corrective action is required. This is illustrated by logic block 32 in FIG. 3. If no corrective action is required, the program proceeds to location B and selects a new time delay based on a new random value, as illustrated by logic block 34 in FIG. 3. After the new time delay is determined, the program returns to point A and continues as indicated.

If it is determined that a corrective action is required, as indicated by the test of logic block 32, the program next determines the state of its associated switch and, in addition, determines whether of not a change of state of its switch (reference characters S1–S10 in FIG. 1 and S1 in FIG. 4) will help to correct the magnitude of the sensed parameter. As an example of the comparisons indicated by logic block 36, reference to FIG. 1 is required. For example, if the control element determines that the voltage across the power source 10 is higher than an acceptable threshold, the logical conclusion is that the closure of its switch will be helpful to increase the voltage drop across resistor RS and therefore decreases the voltage drop across the power source 10. However, if the switch associated with this particular control element is already closed, a change in status of that switch will not help to correct the overvoltage condition. Similarly, if an undervoltage condition was sensed, the opening of a switch which is already opened will not help to correct that condition. If it is determined that the change in connection status of the switch will not help to correct the circuit condition, the program proceeds from logic block 36 to point B in the program and selects a new time delay based on a new random value, as indicated by logic block 34. If it is determined that a change in switch status will help to correct the magnitude of the sensed parameter, as interrogated at logic block 36 in FIG. 3, the program proceeds to logic block 38 and delays for a predetermined period of elapsed time, wherein the time delay is determined as a function of the previously selected random value. Following the time delay, the program proceeds to logic block 40 and once again accesses the magnitude of the sensed parameter to obtain an updated version of that magnitude. The purpose of the procedure indicated by logic block 40 is to make sure that the magnitude of the sensed parameter has not already been corrected by other control elements prior to the time when the time delay elapses. As indicated by logic block 42, the program compares the updated magnitude of the sensed parameter to the threshold value to determine whether corrective action is still required. If the magnitude of the sensed parameter has already been corrected by other control elements, the program proceeds to point B and once again selects a new time delay based on a new random value. If, however, correction is still required, the program proceeds to logic block 44 and changes the status of the switch. In a preferred embodiment of the present invention, the action indicated by logic block 44 would comprise an output from the microprocessor to an output port of the microprocessor which is connected in signal communication (reference numeral 63 in FIG. 4) with a switch. After the action indicated by logic block 44 is performed, the program proceeds to point B and selects a new time delay based on a new random value. After performing the instructions represented by logic block 34, the program proceeds to point A to reexecute the logical steps indicated by the flow chart of FIG. 3.

FIG. 4 illustrates one specific control element, CE1, along with its constituent parts according to one alternative embodiment of the present invention. The control element CE1 is connected electrically between the power bus 50 and the return line 52 as indicated in FIG. 4. For purposes of this description, FIGS. 1 and 4 will be described in conjunction with each other. As can be seen, the control element CE1 is connected in signal communication with the switch S1 which can be any suitable component that is capable of making and breaking contact between two electrical points in the electrical circuit. For example, switch S1 can be a transistor or, alternatively, a power switch of any suitable type. The control logic 57 of the present invention is performed by a microprocessor 58 which receives its power from lines 62 and 64 which are connected to the electrical circuit. In addition, a voltage sensing device 56 is provided for the purpose of determining the voltage potential between lines 50 and 52. Comparing FIGS. 1 and 4, it can be seen that the control element CE1 is shown connected directly between the two power lines 50 and 52 in FIG. 4 while shown connected to an interconnecting line around the switch and resistor in FIG. 1. However, it should be apparent that these two figures are electrically identical.

Figure 5:
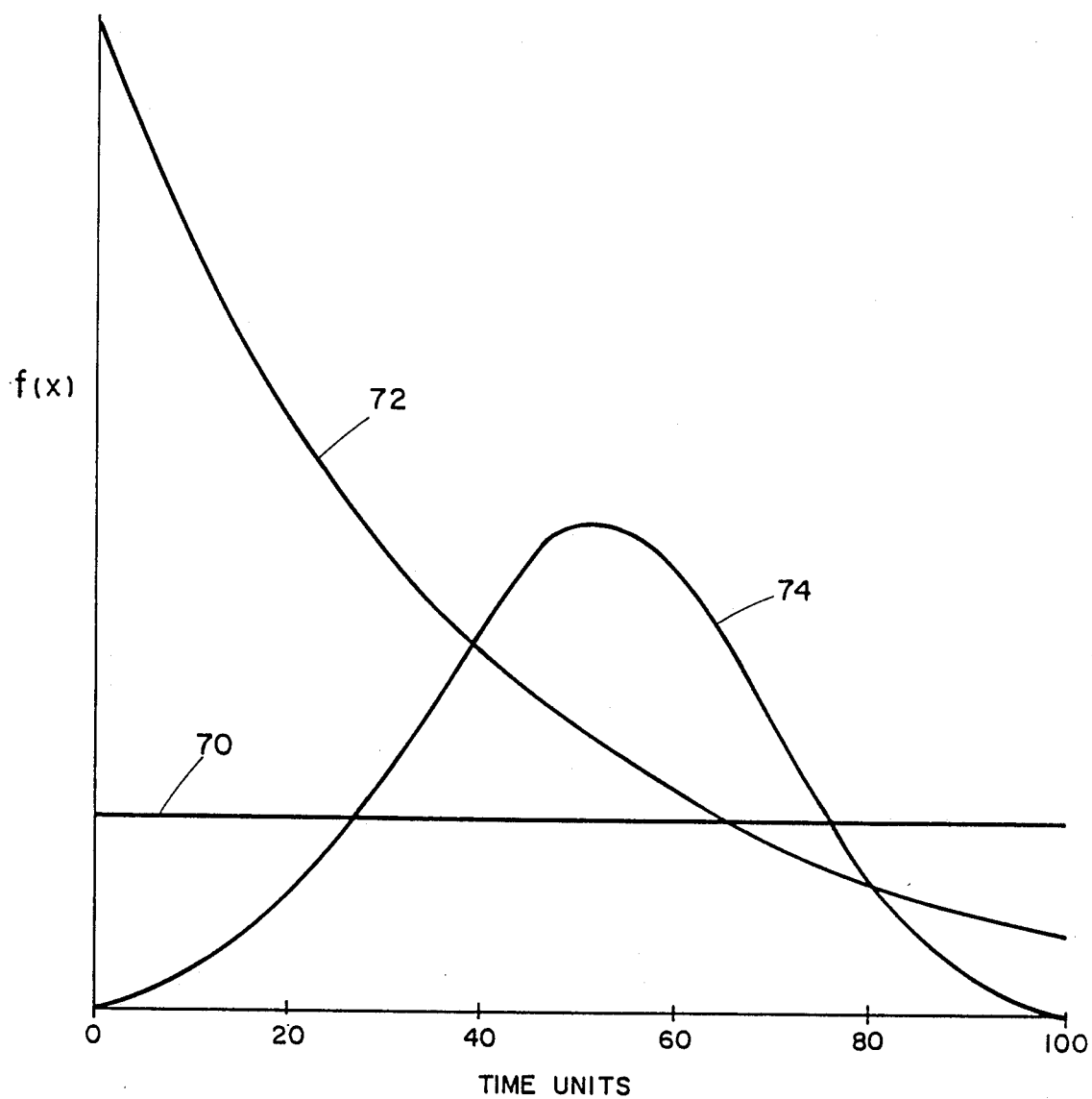
FIG. 5 illustrates three typical probability distribution functions which can be used in accordance with the present invention.

Throughout the description of the present invention, repeated reference has been made to the generation of a random value. It should be apparent that the random value can be generated through the use of many alternative probability distribution functions. Depending on the desired characteristics of the control system, several choices of probability distribution function are available. FIG. 5 illustrates several of those many choices. For example, line 70 in FIG. 5 illustrates the probability distribution function of a uniform distribution. This would represent a situation in which each of the random values within a given range has an equal probability of being chosen by the control element. By comparison, line 72 indicates an exponential probability distribution function which describes the relationship wherein lower magnitudes of random values are more likely to be selected than higher values. Line 74 in FIG. 5 shows a normal probability distribution function wherein the probability of selecting random values between the values of 40 and 60 are much higher than the probability of drawing random values below 20 or above 80. It should be understood that the present invention is operable with any appropriate probability distribution function and should not be considered to be limited to any particular probability distribution function.

Figure 6:
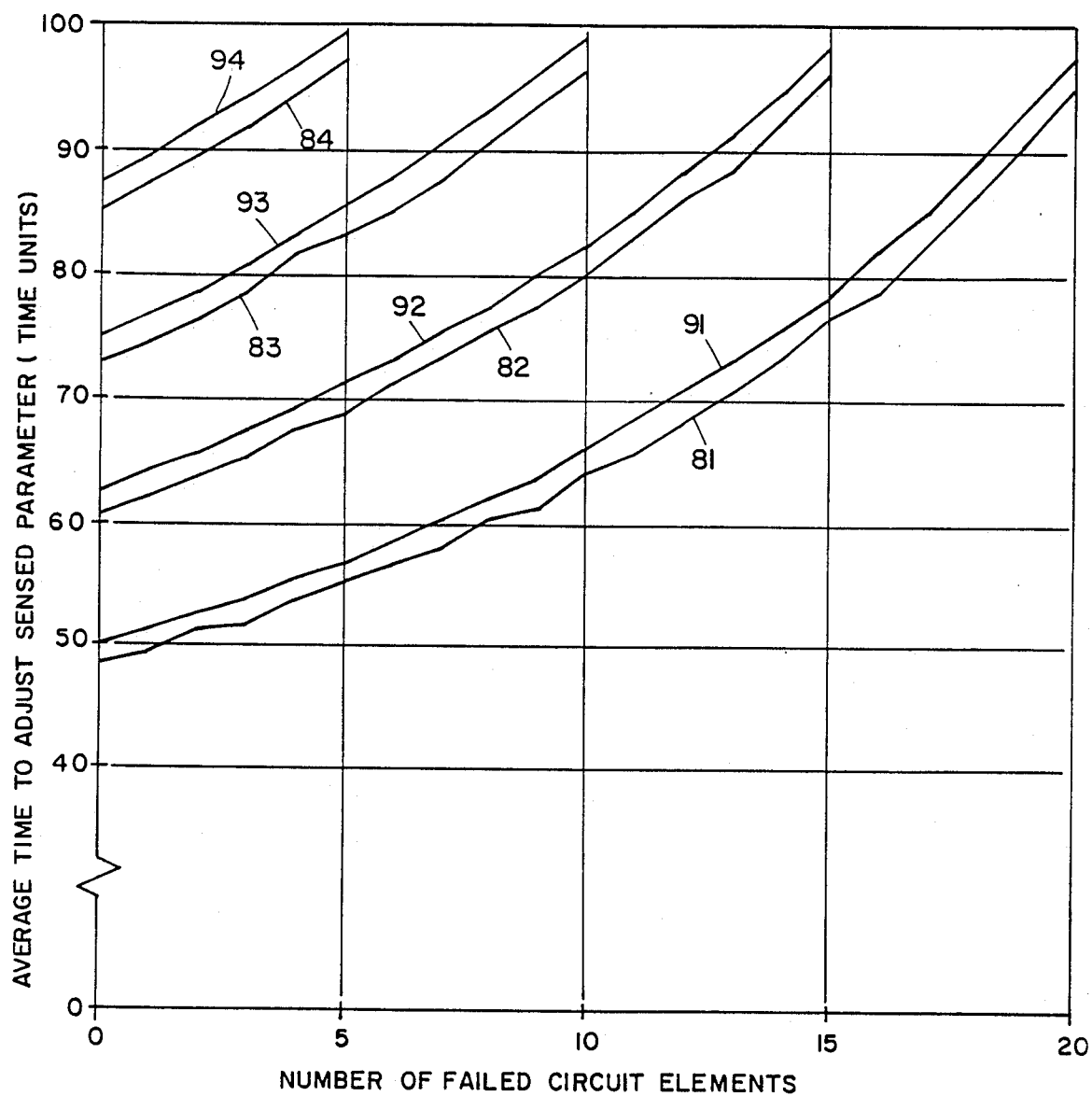
FIG. 6 illustrates the results of computer simulations comparing the present invention with a sequential control technique.

In the discussion above, the present invention has been compared to an alternative system in which each of the control elements is assigned a fixed time delay. In that alternative system, any particular control element utilizes the same time delay for each correction and each of the control elements is assigned a time delay which is different than those assigned to the other control elements. As the present invention was compared to an alternative system of this type, a specific example was discussed in relation to FIG. 2 in which the fastest control elements failed and the overall response time of the control system was delayed for each subsequent required correction of the sensed parameter. The particular example, wherein the two fastest control elements failed, was discussed above with reference to FIG. 2. That discussion related to the worst possible situation in which the two faulty units are the two fastest responding control elements. It is realized that the worst possible case scenario is unlikely to occur and, furthermore, that the failure of control elements is more likely to occur in a random manner. With this in mind, the present invention and the alternative system were simulated, by computer program, to determine the relative response times for the two schemes. The results of those simulations are illustrated in FIG. 6 and discussed below.

Each of the computer simulations described below involve a hypothetical control system in which 40 exemplary control elements or units, are incorporated in the control system. Four separate simulations were examined. The first simulation examined the situation in which 20 of the 40 control elements were required to correct a magnitude of a sensed parameter. The simulation included 500 trials each of 21 conditions, wherein each condition dealt with a different number of operational and failed units. In other words, 500 trials were run for the condition in which all 40 of the control elements, or units, were operational and none of the control elements had failed. Another set of 500 trials were run under the conditions wherein 39 of the control elements were operational and one unit had failed. This procedure was followed for all combinations ranging from 40 operational units to only 20 operational units. In each case, the specific failed units were determined randomly for both the sequential technique and the random technique of the present invention. The results of this simulation are indicated in Table I.

A second simulation was examined in which 40 control elements were available in the circuit and 25 of those units were required to correct the magnitude of a sensed parameter. The format of the simulation was similar to that described above in conjunction with Table I. For each condition, 500 trials were run and the results are reported in table II. The set of conditions ranged from 40 operational units to 25 operational units in which 15 control elements had failed in the latter case. As in all of the simulations, the failures were distributed randomly throughout the 40 control elements.

Table III contains the results of a third simulation in which 30 control elements are required to correct the magnitude of a sensed parameter. In this particular simulation, 500 trials each were run for the conditions ranging from 40 operational units to 30 operational units wherein 10 units had failed. As in the other simulations, the failed units were assigned randomly.

Table IV shows the results of a simulation in which 40 operational units were available and 35 units were required to correct the magnitude of the sensed parameter. As in the other simulations, 500 trials were run on each of the six conditions which range from 40 operational units to 35 operational units with 5 failed units. In all of the simulations, the results are expressed in average time units needed to correct the magnitude of the sensed parameter. It should be understood that the time units used in this description can be any appropriate unit of time. Since in every case, it was assumed that each control element has an equal effect on the sensed parameter, each simulation determined an average time for 35 control elements to become operative.

In all of the simulations, the sequential technique was simulated by assigning each control element a time unit value ranging from 2.5 to 100 in steps of 2.5. In other words, the first control element was assigned a value of 2.5, the second control element was assigned a value of 5.0, and so on. Also, in each simulation of the random technique of the present invention, the time unit value for each of the 40 control elements was randomly assigned using a uniform distribution function in which each number from 1 to 100 was given an equal probability of selection. The purpose of these simulations was not to prove that the present invention provided a faster response time under all of these random conditions. Instead, the purpose of the simulation was to detect whether or not any condition existed in which random failures of control units could conceivably result in a slower average response time when the present invention was implemented as compared to the state of the art control scheme. As described above, the primary purpose of the present invention is to avoid the extremely deleterious condition that exists when the fastest control elements fail. The simulations described herein also show that, hypothetically, the present invention provides a faster response time for all the conditions addressed in the simulations.

With reference to Table I and FIG. 6, the first simulation will be described. Line 81 in FIG. 6 represents the results of the multiple trials simulating the random technique of the present invention. Line 91 represents the multiple trials of the sequential technique. The values represented by lines 81 and 91 in FIG. 6 coincide with the values in table I.

TABLE I

| Operational Units | Failed Units | Avg. Time (Time Units) To Correct Magnitude Of Sensed Parameter (20 Units Required) | |
|---|---|---|---|
| | | Sequential | Random |
| 40 | 0 | 50.00 | 48.68 |
| 39 | 1 | 51.25 | 49.51 |
| 38 | 2 | 52.64 | 51.11 |
| 37 | 3 | 53.95 | 51.96 |
| 36 | 4 | 55.69 | 53.96 |
| 35 | 5 | 56.75 | 55.18 |
| 34 | 6 | 58.61 | 56.75 |
| 33 | 7 | 60.38 | 58.05 |
| 32 | 8 | 62.06 | 60.53 |
| 31 | 9 | 63.97 | 61.21 |
| 30 | 10 | 66.03 | 64.11 |
| 29 | 11 | 68.57 | 65.91 |
| 28 | 12 | 70.90 | 68.17 |
| 27 | 13 | 73.01 | 70.81 |
| 26 | 14 | 75.89 | 73.55 |
| 25 | 15 | 78.76 | 76.78 |
| 24 | 16 | 82.14 | 78.99 |
| 23 | 17 | 85.35 | 82.72 |
| 22 | 18 | 89.10 | 86.58 |
| 21 | 19 | 93.58 | 90.62 |
| 20 | 20 | 97.56 | 95.00 |

Line 82 in FIG. 6 represents the results of the multiple trials for the random technique of the present invention and line 92 in FIG. 6 represents the multiple trials of the simulation of the sequential technique described above. Lines 82 and 92 are graphical representations of the data shown in Table II.

TABLE II

| Operational Units | Failed Units | Avg. Time (Time Units) To Correct Magnitude Of Sensed Parameter (25 Units Required) | |
|---|---|---|---|
| | | Sequential | Random |
| 40 | 0 | 62.50 | 60.84 |
| 39 | 1 | 64.05 | 62.19 |
| 38 | 2 | 65.63 | 63.88 |
| 37 | 3 | 67.53 | 65.03 |
| 36 | 4 | 69.11 | 67.69 |
| 35 | 5 | 71.04 | 68.89 |
| 34 | 6 | 73.00 | 71.08 |
| 33 | 7 | 75.30 | 73.34 |
| 32 | 8 | 77.49 | 75.59 |
| 31 | 9 | 80.02 | 77.69 |
| 30 | 10 | 82.53 | 80.18 |
| 29 | 11 | 85.37 | 83.28 |
| 28 | 12 | 88.47 | 86.21 |
| 27 | 13 | 91.43 | 88.79 |
| 26 | 14 | 94.87 | 92.46 |
| 25 | 15 | 98.65 | 96.34 |

Line 83 of FIG. 6 represents the results of the multiple trials of the random technique of the present invention and line 93 represents the multiple trials simulating the sequential technique. Lines 83 and 93 are graphical representations of the data shown in Table III.

TABLE III

| Operational Units | Failed Units | Avg. Time (Time Units) To Correct Magnitude Of Sensed Parameter (30 Units Required) | |
|---|---|---|---|
| | | Sequential | Random |
| 40 | 0 | 75.00 | 72.92 |
| 39 | 1 | 76.85 | 74.52 |
| 38 | 2 | 78.86 | 76.55 |
| 37 | 3 | 80.85 | 78.73 |
| 36 | 4 | 83.18 | 81.08 |
| 35 | 5 | 85.52 | 83.24 |
| 34 | 6 | 87.90 | 85.16 |
| 33 | 7 | 90.56 | 87.70 |
| 32 | 8 | 93.30 | 90.88 |
| 31 | 9 | 96.16 | 93.67 |
| 30 | 10 | 99.20 | 96.79 |

Line 84 of FIG. 6 represents the results of the multiple trials of the random technique of the present invention and line 94 in FIG. 6 represents the multiple trials simulating the sequential technique. Lines 84 and 94 are graphical representations of the data shown in Table IV.

TABLE IV

| Operational Units | Failed Units | Avg. Time (Time Units) To Correct Magnitude Of Sensed Parameter (35 Units Required) | |
|---|---|---|---|
| | | Sequential | Random |
| 40 | 0 | 87.50 | 85.13 |
| 39 | 1 | 89.65 | 87.06 |
| 38 | 2 | 92.01 | 89.51 |
| 37 | 3 | 94.34 | 91.97 |
| 36 | 4 | 96.92 | 94.31 |
| 35 | 5 | 99.62 | 97.32 |

As can be seen by the graphical representation of the results in FIG. 6 and the numeric representation of the results in Tables I, II, III and IV, the random technique of the present invention provides a faster average response under all of the conditions considered in the simulation. To further illustrate the results of the simulations, one particular example will be described in detail. Since all of the simulations were run according to the same basic techniques, the following description should also describe and illustrate all of the other results contained in the four tables and in FIG. 6. The specific example to be considered is illustrated in Table IV. More precisely, the specific example wherein 37 of the control elements were operational and 3 of the control elements had failed will be discussed. The simulation of the sequential technique was performed as follows. Forty hypothetical elements were each assigned a time delay value. The first control element was assigned the value of 2.5 time units, the second control element was assigned the value of 5.0 time units and so on with the 40th control element being assigned a time delay of 100 time units. The three failed units were randomly assigned for each of the 500 trials. After each random assignment of the failed units, the simulation determined the time required to activate 35 of the 37 operational units. As can be seen in Table IV, the average time for the 500 trials was 94.34 time units. For the same set of conditions, the random technique of the present invention was simulated. To simulate the random technique of the present invention, each of the 40 control elements was randomly assigned a time delay value from a uniform probability distribution function wherein each value from 1 to 100 was given an equal probability of occurring. After the assignment of the random time values, 3 of the 40 units were randomly identified as being failed units. Then, the simulation proceeded to accumulate operational units for increasing time values from 1 to 100 until 35 units were achieved. The average time necessary to bring 35 of the 37 operational units on line was 91.97 time units. The philosophy described above in conjunction with Table IV, in which 37 units were operational and 35 units were required to correct a magnitude of a sensed parameter, was used in each of the simulations shown in the tables. With respect to this particular example, FIG. 6, and particularly lines 84 and 94, correspond to the values described above. For example, line 94 represents the sequential trials and line 84 represents the trials relating to the simulation of the present invention. The point on line 84 for 3 failed circuit elements corresponds to the value of 91.97 along the axis representing the average time to adjust the sensed parameter measured in time units. Similarly, the point on line 94 representing 3 failed circuit elements represents the value of 94.34 measured along the same axis.

It should be understood that the computer simulations described above are intended not to prove the most valuable characteristic of the present invention but, instead, to verify that under the simulated conditions the present invention does not create a slower average response for the control system in which it is utilized. It should further be understood that the primary advantage of the present invention is that it avoids the worst case scenario in which each control element is assigned a fixed time delay and the fastest control elements fail.

Although the present invention has been described with significant detail and has been illustrated with particularity, it should be understood that alternative embodiments of the present invention should be considered within its scope.

What we claim is:

1. A control system, comprising:
   means for generating a random value;
   means for measuring elapsed time;
   means for accessing a magnitude of a sensed parameter;

means for determining a time delay as a function of said random value, said generating means and said determining means being associated in signal communication with each other; and means for changing a connection status between a corrective component and an electrical circuit in response to said magnitude of said sensed parameter following a period of elapsed time after said magnitude is sensed, said period of elapsed time being a function of said time delay, said changing means being associated in signal communication with said determining means, said measuring means and said accessing means.

2. The control system of claim 1, wherein:
said generating means, said measuring means, said accessing means, said determining means and said changing means are associated together as a first control element and said first control element is associated with another similarly configured control element.

3. The control system of claim 2, wherein:
each of said control elements is associated in signal communication with an individual one of a plurality of said corrective components and with said electrical circuit.

4. The control system of claim 3, wherein:
said changing means comprises an output port of a microprocessor.

5. The control system of claim 3, wherein:
said corrective component is a resistor.

6. The control system of claim 1, wherein:
said determining means is a segment of a software program.

7. A distributed control system, comprising:
a plurality of control elements, each of said plurality of control elements comprising means for generating a random value, means connected in signal communication with said generating means for determining a time delay as a function of said random value, means for accessing a magnitude of a sensed parameter, means for measuring elapsed time and means, connected in signal communicating with said accessing means, said measuring means and said determining means, for changing a connection status between a corrective component and an electrical circuit in response to a preselected value of said sensed parameter magnitude following a predetermined period of said elapsed time after said magnitude is sensed, said period of elapsed time being determined as a function of said time delay.

8. The system of claim 7, wherein:
said random value is generated as a function of an exponential probability distribution function.

9. The system of claim 7, further comprising:
a switch connected in signal communication with said connection status changing means.

10. The system of claim 7, wherein:
said connection status changing means comprises an output port of a microprocessor.

11. The system of claim 7, wherein:
said corrective component is a resistor.

12. The system of claim 7, wherein:
said sensed parameter is electrical current.

13. The system of claim 7, wherein:
said sensed parameter is electrical voltage.

14. The system of claim 7, wherein:
said sensed parameter is power factor.

15. The system of claim 7, wherein:
a microprocessor comprises said generating means.

16. The system of claim 7, wherein:
said plurality of control elements is connected in electrical communication with said electrical circuit.

17. A distributed control system, comprising:
a plurality of control elements, each of said plurality of control elements comprising means for generating a random value, means for determining a time delay as a function of said random value, means for measuring elapsed time, means for accessing a magnitude of a sensed parameter and means for changing a connection status between a corrective component and an electrical circuit in response to the difference between said magnitude of said sensed parameter and a preselected reference magnitude following a predetermined period of said elapsed time after said parameter magnitude is sensed, said period of elapsed being a function of said time delay, said generating means, said determining means, said measuring means and said accessing means being connected in signal communication with each other.

18. The system of claim 17, further comprising:
a switch connected in signal communication with said changing means, said switch being electrically connected to said electrical circuit.

19. The system of claim 17, wherein:
each of said corrective components is connected in electrical communication with a said electrical circuit.

20. A control system having a control element, said corrective component comprising:
means for generating a random value;
means for determining a time delay as a function of said random value, said determining means being associated in information communication with said generating means;
means for accessing a measured magnitude of a sensed parameter;
means for measuring elapsed time; and
means for changing a connection status between a circuit element and an electrical circuit in response to said magnitude of a said sensed parameter following a period of said elapsed time after said magnitude is sensed, said period of elapsed time being a function of said time delay, said changing means being associated in signal communication with said determining means, said accessing means and said measuring means.

21. The system of claim 20, further comprising:
means for comparing said measured magnitude to a predetermined threshold value.

22. A method for controlling an electrical system, comprising:
generating a random value;
determining a time delay as a function of said random value;
accessing a measured magnitude of a sensed parameter;
measuring elapsed time; and
changing a connection status between a corrective component and an electrical circuit in response to said magnitude of said sensed parameter following a period of said elapsed time after said magnitude is sensed, said period of elapsed time being a function of said time delay.

* * * * *